United States Patent [19]

Flavio

[11] 4,276,465
[45] Jun. 30, 1981

[54] ELECTRIC OVEN FOR THE CONTINUOUS BAKING OF PIZZAS

[75] Inventor: Rinaldi Flavio, Massa, Italy

[73] Assignee: Superforni Rinaldi S.p.A., Italy

[21] Appl. No.: 911,492

[22] Filed: Jun. 1, 1978

[51] Int. Cl.³ .............................................. A21C 1/42
[52] U.S. Cl. .................................. 219/388; 99/443 C; 432/239
[58] Field of Search .................. 219/388; 99/360, 364, 99/386, 373, 443 C, 450.1, 420; 432/239, 230; 198/733, 734

[56] References Cited

U.S. PATENT DOCUMENTS

| | | | |
|---|---|---|---|
| 1,013,794 | 1/1912 | Martin | 198/733 |
| 1,830,548 | 11/1931 | Ipsen et al. | 219/388 |
| 2,326,165 | 8/1943 | Pelosi | 198/734 |
| 2,822,915 | 2/1958 | Hampton | 198/733 |
| 3,235,102 | 2/1966 | Chapman | 198/733 |
| 3,365,053 | 1/1968 | Brill | 198/733 |
| 3,515,854 | 6/1970 | Williams | 219/388 |
| 4,026,202 | 5/1977 | Szpur | 99/443 C |
| 4,072,093 | 2/1978 | Zimmer et al. | 219/388 |

FOREIGN PATENT DOCUMENTS

| | | | |
|---|---|---|---|
| 655473 | 7/1963 | Italy | 432/239 |
| 103660 | 1/1963 | Netherlands | 198/733 |

Primary Examiner—Elliot A. Goldberg
Assistant Examiner—Bernard Roskoski
Attorney, Agent, or Firm—Birch, Stewart, Kolasch & Birch

[57] ABSTRACT

An electric oven for the continuous baking of pizzas has a baking chamber with a single front opening through which pizzas positioned in baking tins are loaded and from which baked pizzas are unloaded, the pizzas in their baking tins being conveyed through the baking chamber by a horizontal conveyor extending longitudinally in the baking chamber and passing through two contiguous regions in which the baking tins are conveyed respectively away from and towards the front opening by pallet members attached to the conveyor which engage the individual baking tins and push them along a horizontal support track in the baking chamber, the support track having two end portions for loading and unloading, respectively, the end portions project through the front opening of the baking chamber.

13 Claims, 7 Drawing Figures

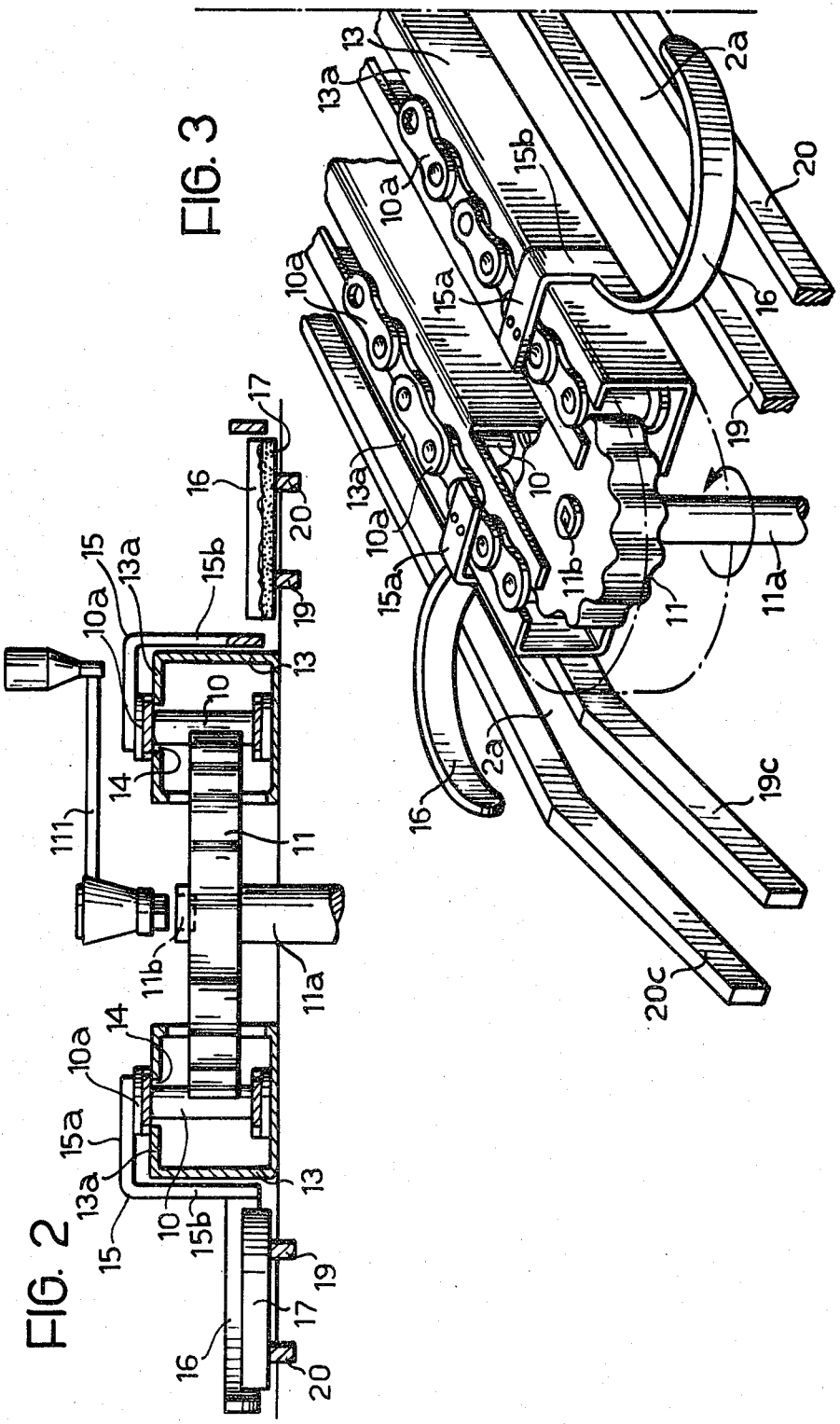

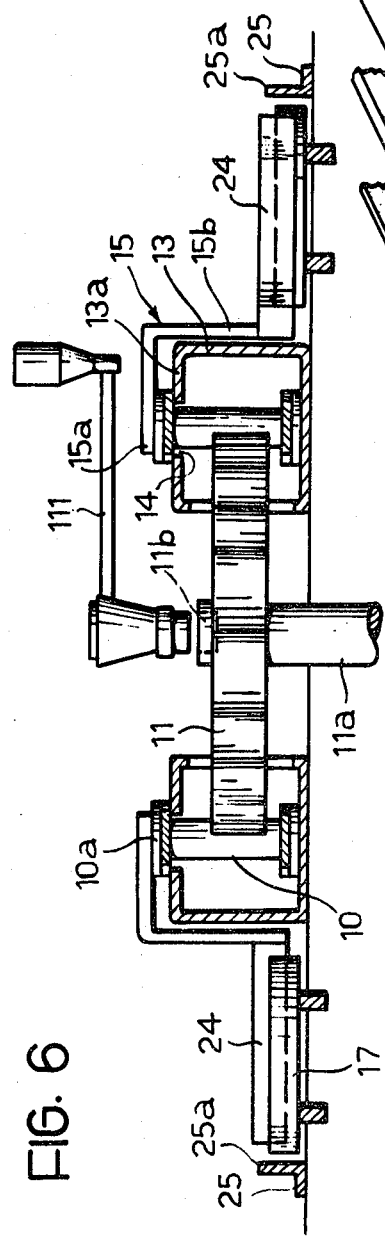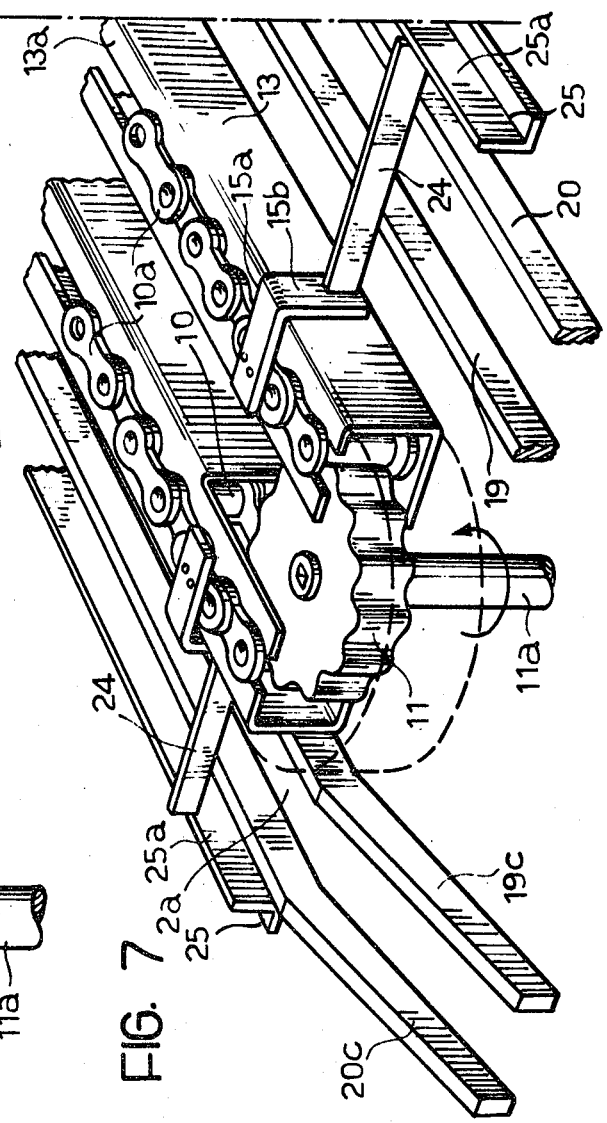

ELECTRIC OVEN FOR THE CONTINUOUS BAKING OF PIZZAS

BACKGROUND OF THE INVENTION

The present invention relates to an electric oven for the continuous baking of pizzas previously placed in tins, the oven being of the kind having a baking chamber provided with heater means, a continuously-driven conveyor for conveying, in succession, through the said baking chamber, a number of pizzas placed in respective baking tins, the conveyor being accessible from an area outside the baking chamber for the loading of pizzas to be baked, and for the unloading of baked pizzas.

In order to carry out continuous production, in ovens of the aforesaid kind, of pizzas of a quality and aroma comparable with pizzas of the traditional type, it is necessary to select accurately suitable interdependent values of the oven temperature and humidity, and the time spent by each pizza in the oven, according to the weight and size of each pizza to be baked and the nature of the ingredients of the pizza.

The electric ovens hitherto widely used for the continuous baking of pizzas are basically of the rectilinear tunnel kind. Such tunnel ovens suffer from recognized disadvantages both of a technical and economic nature. Firstly, an obvious disadvantage is the relatively large size of such ovens even when, for example, only low or medium production yields are required, since the size of the ovens restricts the space available for easy access to the opposite ends of the oven for the efficient loading and unloading of the pizzas. Another considerable disadvantage of this kind of oven is the relative difficulty of satisfactory control of the oven temperature and humidity, without recourse to the use of expensive monitoring and adjusting devices of these parameters. Yet another disadvantage is the size of the baking space, which must necessarily be large for the uniform heating of the oven to the desired working temperature, necessitating a predetermined, non-negligible power consumption.

The main object of the present invention is to provide an electric oven for the continuous production of pizzas in baking tins, with structural and functional characteristics such as to overcome the aforementioned disadvantages of previously known rectilinear ovens.

SUMMARY OF THE INVENTION

The invention provides an electric oven for the continuous baking of pizzas in baking tins, comprising: a structure defining a baking chamber; heater means in said baking chamber; a continuously driven conveyor means for conveying in succession through said baking chamber a number of pizzas placed in individual baking tins, and access means affording access to the conveyor means from outside the baking chamber for the loading of pizzas to be baked and the unloading of baked pizzas. An improvement according to the present invention comprises: means defining a single front opening of the baking chamber through which said chamber is accessible from the outside; said conveyor means comprising a horizontal endless conveyor provided with a plurality of pallet members, and having support and drive wheels with vertical axes of rotation; said conveyor extending longitudinally within the baking chamber and bounding within said chamber two contiguous areas both of which are accessible from outside the oven through the said front opening; a horizontal support track extending longitudinally within said two areas of the baking chamber below the pallet members of said conveyor, said baking tins being slidable along said support track, and respective end portions of said support track projecting outside the baking chamber through said front opening.

Preferably each baking tin is circular and each pallet member of said conveyor has a shaped profile which is concave towards the direction of movement of said conveyor and which is adapted to engage a baking tin from the outside, the oven including means for disengaging each respective baking tin from each said pallet member at the delivery end portion of said support track.

BRIEF DESCRIPTION OF THE DRAWINGS

The invention will be further described, by way of example, with reference to the accompanying drawings, in which:

FIGS. 2 and 3 are diagrammatic end and perspective views respectively, on an enlarged scale, of a part of the oven of FIG. 1, illustrating the conveyor thereof;

DETAILED DESCRIPTION OF THE ILLUSTRATED EMBODIMENTS

Figure 1:
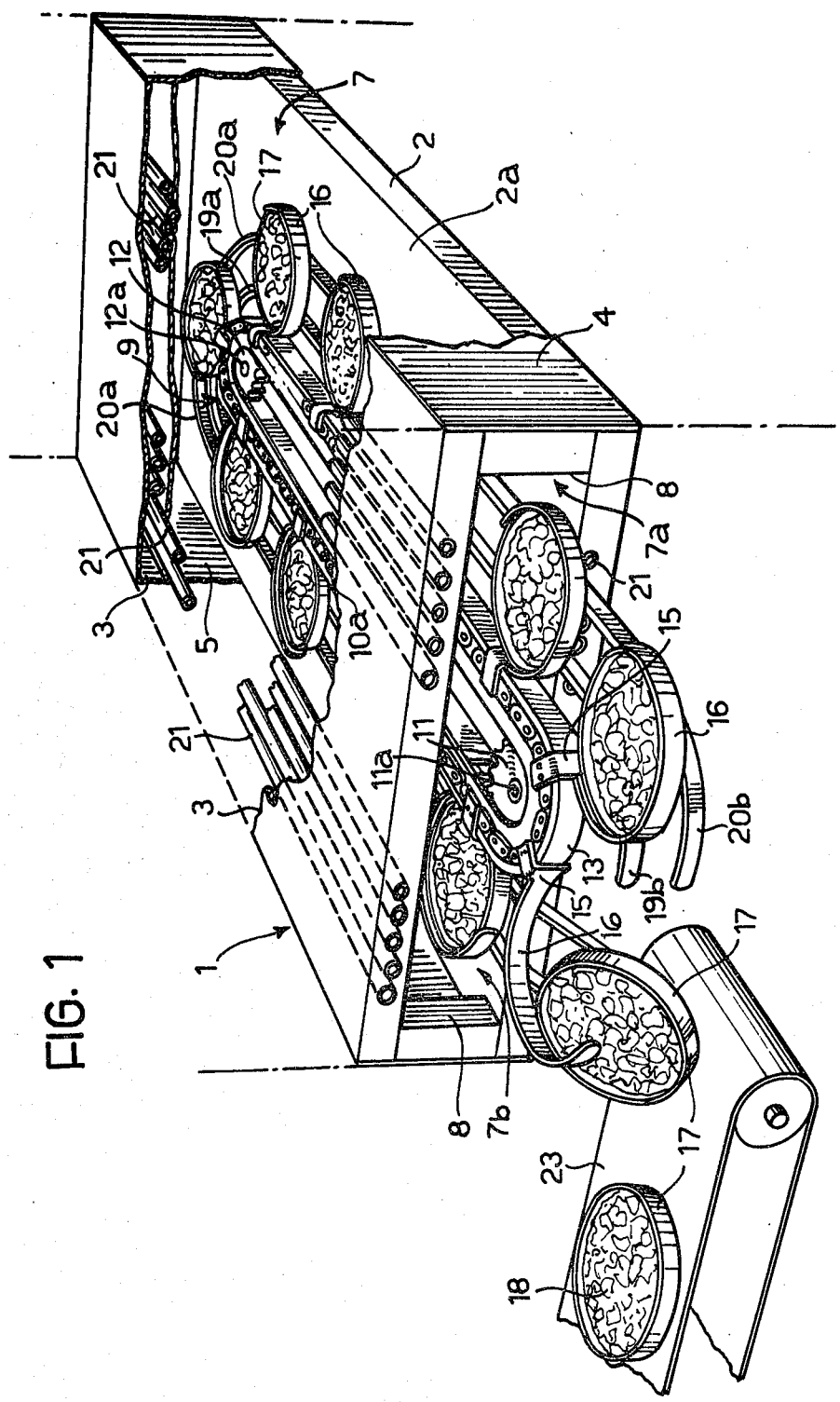
FIG. 1 is a diagrammatic perspective view, partly cut away, of an electric oven according to one embodiment of the invention.

Referring to the drawings, an electric oven according to this invention for the continuous baking of pizzas in tins, for example, an oven of the cubicle kind (not shown) is fitted with a baking unit indicated generally by 1, consisting essentially of a parallelepipedal structure comprising a flat hollow base 2, a flat hollow cover 3, longitudinal side walls 4, 5 and an end wall 6, all joined together and reinforced by conventional means, not shown. This structure houses a baking chamber 7 accessible from outside the said structure and the oven, through a single front opening 8, of predetermined dimensions.

Reference numeral 9 indicates generally a conveyor of the horizontal pallet kind, assembled in the baking chamber 7 and extending longitudinally along the centerline of the chamber 7. The said pallet conveyor 9 has, within the baking chamber 7, two contiguous areas 7a, 7b, both accessible from outside the oven only through the front opening 8.

The conveyor 9 consists of an endless sprocket chain 10 mounted upon and driven by a pair of toothed sprocket wheels 11, 12 the axes of which are vertical. The sprocket wheel 11, which is the drive wheel, is keyed on to a vertical shaft 11a which is driven, for example, by an electric motor (not shown) and is mounted in the unit 1, near the front opening 8 and near the inner wall 2a of the hollow base 2. Advantageously the said drive wheel 11, and its shaft 11a, are accessible from the outside of the said unit 1. For example, they may be assembled outside the said unit, while the upper end of the shaft 11a is fitted with a polygonal socket 11b, designed to receive a complementary shaped spigot carried by a handle 111 (FIG. 2). By means of this handle 111 it is possible to move the pallet conveyor 9 manually so as to allow the unloading of pizzas from the baking chamber 7 in the event of breakdown of the electric motor or accidental power failure.

The other toothed sprocket 12, which is an idle sprocket, is rotatably mounted upon a pin 12a close to the end wall 6 of the baking chamber 7 and at a predetermined distance from it.

The sprocket chain 10 is kept in tension by conventional means, not shown, for the resilient recovery of expansions due to the thermal excursions of the baking chamber and for the compensation of gaps resulting, for example, from wear.

Shown generally at 13 is a protective casing of the chain 10, the said casing having an upper wall 13a (FIGS. 2, 3) provided with a longitudinally extending continuous slot 14. The chain 10 is dimensioned and arranged in the casing 13 so that its upper links 10a are on the outside, parallel and closely spaced from the upper wall 13a of the casing 13.

Shown as 15 is each of a number of inverted L-shaped brackets, affixed to the chain 10 at regularly spaced intervals. In particular, each bracket 15 has an upper horizontal outwardly projecting wing 15a affixed by conventional means to a respective link 10a of the chain 10, and a vertical wing 15b which extends parallel to the vertical wall of the casing 13. To the lower free end of the said vertical wing 15b there is affixed, cantilever fashion, a pallet arm 16 of concave semicircular shape, directed with its concave side facing in the direction of movement of the conveyor chain 10. In the illustrated apparatus, which uses circular baking tins 17, each pallet arm 16 has a semicircular section of a diameter substantially equal to the outer diameter of the respective baking tin 17 it is destined to engage.

Two parallel flat rails are supported upon the upper wall 2a of the said hollow base 2. The rails 19, 20 are spaced apart by a predetermined distance, and extend into the areas 7a, 7b of the baking chamber 7 parallel to the two parallel branches of the chain 10 and below the pallet arms 16. The rails 19 and 20 have semicircular parts 19a, 20a in proximity to the end wall 6 of the baking chamber 7. The rails 19, 20 constitute a guide slide and support for the baking tins 17 during their passage within the baking chamber 7.

In correspondence with the opposite end of the conveyor, the rails 19, 20 have respective end portions 19b, 20b and 19c, 20c, extending outside the baking chamber 7 through the front opening 8 of same. In particular, the end portions 19b, 20b are curvilinear with a common centre of curvature coinciding with the centre of rotation of the sprocket drive wheel 11, affording a bearing and loading surface for the baking tins 17 containing pizzas 18 to be baked.

The end portions 19c, 20c are inclined outwards and downwards from the front opening 8 with a predetermined inclination, and constitute essentially a chute for off-loading the circular baking tins 17 containing baked pizzas 18 leaving the baking chamber 7. Ths inclination is so chosen that when a baking tin 17 thrust forward by its pallet arm 16 reaches and passes over the said chute 19c, 20c, then disengagement of the said tin 17 from the said pallet arm 16 commences, and is completed, before the said pallet arm 16, drawn along by the conveyor chain 10, starts its curvilinear trajectory outside the baking chamber 7. Towards the end of this trajectory the pallet arm 16 thus released engages a new baking tin 17 already placed on the loading surface formed by the curvilinear end portions 19b, 20b thereby pushing the tin 17 forward into the baking chamber 7.

The source of heat for the baking chamber 7 consists of two equal numbers of tubular radiant elements, all shown as 21, extending longitudinally and supported, each independently of the other. The tubular radiant elements extend into the hollow base 2 and are removably supported on the hollow cover 3 by a corresponding number of conventional U bolts, not shown.

Figure 4:
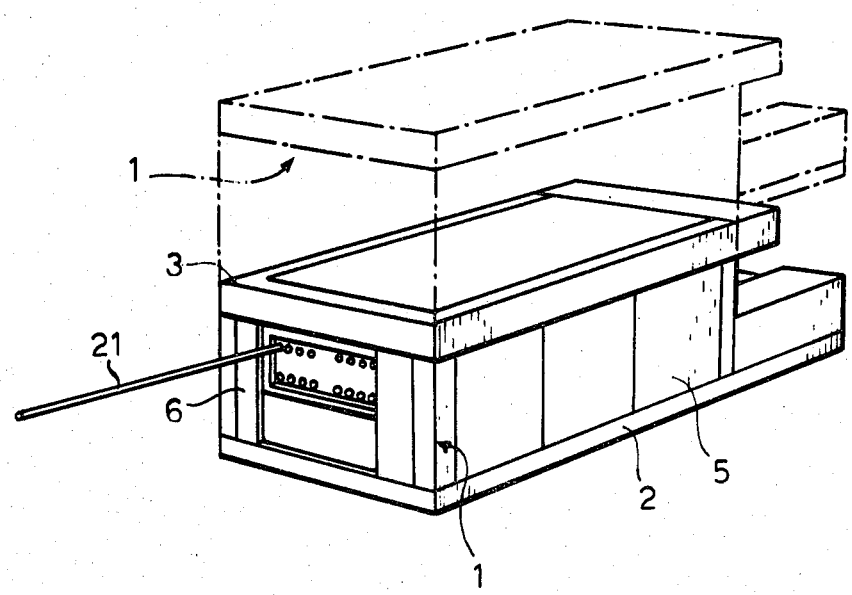
FIG. 4 is a perspective diagrammatic rear view of an oven according to one embodiment of the invention.
Figure 5:
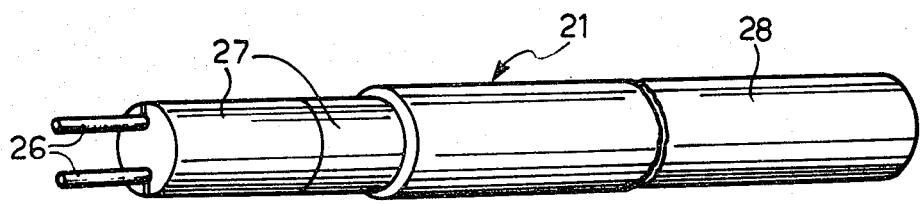
FIG. 5 is a perspective view on an enlarged scale of part of a radiant element employed in the oven of FIG. 4, and FIGS. 6 and 7 are end and perspective views respectively corresponding to FIGS. 2 and 3 illustrating part of an oven according to another embodiment of the invention.

Referring particularly to FIG. 5, each of the said radiant elements 21 consists of a heating element 26 supported in a series of ceramic cylindrical cores 27, interconnected and housed in turn within a tube of stainless steel 28, completely sealed in its part which extends into the baking chamber 7. Each of the said tubular radiant elements 21 can be removed from and replaced in the baking chamber 7 from the rear of the oven of this invention (FIG. 4) so that a possible replacement does not require any dismantling operation of the said oven structure, as has been necessary hitherto in continuous baking ovens.

Shown diagrammatically as 23 is a horizontal endless belt conveyor arranged close to the lower free end of the unloading chute (19c, 20c) and used advantageously for conveying the baked pizzas 18 leaving the oven to a collector station, not shown.

In the variant illustrated in FIGS. 6 and 7, the pallet conveyor 9 is equipped with a number of straight pallet arms 24, while upon the wall 2a of the hollow base 2 there is affixed, by conventional means (not shown), an L-section member 25 which extends longitudinally and parallel to the support rails 19, 20 of the baking tins 17. The vertical wing 25a of this L-section member constitutes a side wall which keeps the tins 17 upon the rails 19, 20 during the passage of the tins 17 through the baking oven 7.

The main advantages achieved by an electric oven according to the invention are summarised as follows:
1. Accessibility of the baking chamber 7 from one side only of the oven through one single front opening 8. This in turn entails the following advantages in practice:
    restricted requirements of available space for the installation, and movement involved in the loading and unloading operations of the pizzas in baking tins;
    the possibility of monitoring and adjusting the best parameters for perfect baking of the pizza (temperature, conveyor speed) by the operator;
    the possibility of operation by only one operator;
    the possibility of simple automation of both the loading and unloading operations, with resultant reduction in running costs;
    the possibility of carrying out the manual movements of the pallet conveyor so as to allow unloading of the pizzas taken into the baking chamber in the event of accidental power failure or even breakdown of the conveyor drive motor.
2. Tubular radiant elements 21 which can be plugged in, or taken out, independently of one another, from the back of the oven. These elements as described have the following advantages:
    stopping times for possible breakdowns reduced, since repair and replacement of the radiant elements can be carried out easily and speedily;

complete electrical insulation of the radiant elements in the presence of the metal walls of the baking chamber even under the heaviest operating conditions at high temperatures;

complete protection of each of the radiant elements from external effects such as humidity or steam present in the baking chamber, and in the event of sudden thermal shock due to sudden cooling.

3. Pallet conveyor 9. This has the following advantages:

the pallet conveyor 9, consisting of the chain 10 and of their relative number of brackets 15 and of the pallets 16, 24, the sprocket wheels 11, 12 and their support elements, may constitute, conventionally, an individually handled unit, that is to say, extraction from and reintroduction into the baking chamber through the front opening 8 of the same, without the need for dismantling the oven structure;

the interruption or "down" time of the conveyor, necessary for maintenance purposes, is minimized;

the possibility of periodic checks (programmed maintenance at times when the oven is idle).

4. Module construction (FIG. 4). This construction has the following advantages:

the structural and dimensional characteristics of the oven described with reference to the accompanying drawings, may be, and are, so defined as to permit the superposition (FIG. 4) of two or more ovens of the kind described above or superimposing the oven with other oven units with different characteristics;

the possibility of attaining high production rates by further rationalization of the available space;

the improvement of the resources for the loading and unloading operations of the product in tins. The invention being thus described, it will be obvious that the same may be varied in many ways. Such variations are not to be regarded as a departure from the spirit and scope of the invention and all such modifications as would be obvious to one skilled in the art are intended to be included within the scope of the following claims.

What is claimed is:

1. An electric oven for the continuous baking of a food product in baking tins, comprising:

a structure defining a baking chamber;

heater means in said baking chamber;

a continuously driven conveyor means for conveying in succession through said baking chamber a number of food products placed in individual baking tins, and access means affording access to the conveyor means from outside the baking chamber for the loading of food products to be baked and the unloading of baked food products wherein the improvement comprises:

said access means defining an opening defined in the front of the baking chamber through which said chamber is accessible from the outside;

said conveyor means comprising a horizontal endless conveyor provided with a plurality of pallet members and having support and drive wheels with vertical axes of rotation;

said conveyor extending longitudinally within the baking chamber and defining within said chamber two contiguous areas both of which are accessible from outside the oven through the said front opening;

a horizontal support track comprising at least two spaced rails extending longitudinally within said two areas of the baking chamber below the pallet members of said conveyor, said baking tins having a bottom surface which is directly exposed to heat generated by said heating means in said baking chamber and being slidable along said support track, and said support track projecting outside the baking chamber through said front opening for readily loading baking tins into the oven and readily unloading baking tins therefrom including a first end portion defining a horizontal loading portion on which said baking tins are positioned for subsequent engagement by said conveyor means for transportation through said baking chamber and a second end portion being sloped downwardly from said horizontal support track defining a discharge portion for disengaging said baking tins from said conveyor means.

2. An electric oven as in claim 1, wherein means are provided in said baking chamber for keeping the said baking tins on said baking tin support track during their movement within the baking chamber.

3. An electric oven as in claim 2, wherein each said baking tin is circular and each pallet member of said conveyor having a shaped profile which is concave towards the direction of movement of said conveyor and which is adapted to engage a baking tin from the outside, and said second end portion defining means for disengaging each respective baking tin from each said pallet member at the delivery end portion of said support track.

4. An electric oven as in claim 3, wherein each said pallet member having a predetermined, essentially semicircular profile, of predetermined diameter substantially equal to the diameter of the circular baking tins, said semicircular pallet members constituting the said means for keepting the baking tins on said support track during their movement through the baking chamber.

5. An electric oven as in claim 3, wherein said second portion of the said support track is inclined as a chute with a predetermined inclination outwardly and downwardly from the baking chamber, the said chute constituting the said means for disengaging each baking tin from its respective pallet member.

6. An electric oven as in claim 2, wherein said means for keeping the tins on the said support track consist of a shaped longitudinally extending member fixed in the said baking chamber and defining a vertical edge extending along one side of and parallel to said support track in said two areas thereof.

7. An electric oven as in claim 1, wherein said pallet conveyor consists of a sprocket chain and a pair of sprocket wheels supporting said chain, one of said wheels being driven and being disposed in proximity to the said front opening of the baking chamber.

8. An electric oven according to claim 1, wherein said conveyor means slidably engages a top portion of said at least two rails to push said baking tins therealong.

9. An electric oven according to claim 1, wherein said heater means including at least two groups each including a plurality of individually removable heating elements longitudinally extending along said support track.

10. An electric oven according to claim 1, wherein said drive wheel being operatively connected to a motor for imparting rotary motion thereto.

11. An electric oven according to claim 1, wherein said drive wheel being operatively connected to a handle for manually imparting rotary motion thereto.

12. An electric oven according to claim 9, wherein at least two groups of heater elements extend above said support track and at least two groups of heater elements extend below said support track.

13. An electric oven according to claim 9, wherein said heating elements being removable from a rear wall of said baking chamber.

* * * * *

UNITED STATES PATENT AND TRADEMARK OFFICE
CERTIFICATE OF CORRECTION

PATENT NO. : 4,276,465
DATED : June 30, 1981
INVENTOR(S) : Flavio Rinaldi

It is certified that error appears in the above—identified patent and that said Letters Patent is hereby corrected as shown below:

On the Title Page, change the name of the patentee from
"Flavio" to -- Rinaldi --

In the heading of the patent, under the category "[75] Inventor:"
change "Rinaldi Flavio" to -- Flavio Rinaldi --

Signed and Sealed this

Tenth Day of August 1982

[SEAL]

Attest:

GERALD J. MOSSINGHOFF

*Attesting Officer*     *Commissioner of Patents and Trademarks*